United States Patent
Moorlag et al.

(10) Patent No.: US 9,573,360 B2
(45) Date of Patent: Feb. 21, 2017

(54) THERMALLY CONDUCTIVE AQUEOUS TRANSFIX BLANKET

(71) Applicant: XEROX CORPORATION, Norwalk, CT (US)

(72) Inventors: Carolyn Moorlag, Mississauga (CA); Barkev Keoshkerian, Thornhill (CA); Yu Qi, Penfield, NY (US); Brynn Mary Dooley, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 490 days.

(21) Appl. No.: 14/021,347

(22) Filed: Sep. 9, 2013

(65) Prior Publication Data

US 2015/0070454 A1    Mar. 12, 2015

(51) Int. Cl.
| | |
|---|---|
| *B41J 2/005* | (2006.01) |
| *C09D 11/324* | (2014.01) |
| *B41N 10/00* | (2006.01) |
| *C09D 11/30* | (2014.01) |
| *B41M 5/025* | (2006.01) |

(52) U.S. Cl.
CPC ........... *B41J 2/0057* (2013.01); *B41N 10/00* (2013.01); *C09D 11/30* (2013.01); *C09D 11/324* (2013.01); *B41M 5/0256* (2013.01)

(58) Field of Classification Search
CPC ............... B41J 2/0057; B41J 2/01; B41J 2/05; B41J 2/1433; B41J 2/17; B41J 2/1755; B41J 2/17503; B41J 2/17593; B41J 2/21; B41J 2/211; B41J 2/2107; B41J 2/2114; B41J 2/2117; B41J 2/2056; B41J 11/0015; B41J 11/002; B41J 3/60; B41J 2002/012; B41M 5/0256; B41M 5/0011; B41M 5/0017; B41M 5/52; B41M 5/5218; B41M 7/00; B41M 7/0072; B41M 7/0081; B41M 7/009; B41N 10/00; G03G 2215/2048; Y10S 977/974; C09D 11/005; C09D 11/30; C09D 11/32; C09D 11/322; C09D 11/328; C09D 11/36; C09D 11/38; C09D 11/40; C09D 11/52; C09D 11/54; C09D 11/101; C09D 11/324
USPC ...... 347/9–22, 56, 86, 88, 95–105; 977/742, 977/753, 902; 399/320, 399; 106/31.13, 106/31.27, 31.6, 31.85, 31.77
See application file for complete search history.

(56) References Cited

U.S. PATENT DOCUMENTS

| | | | |
|---|---|---|---|
| 3,590,000 | A | 6/1971 | Palermiti et al. |
| 3,655,374 | A | 4/1972 | Palermiti et al. |
| 3,720,617 | A | 3/1973 | Chatterji et al. |
| 3,983,045 | A | 9/1976 | Jugle et al. |
| 5,389,958 | A | 2/1995 | Bui et al. |
| 6,004,714 | A | 12/1999 | Ciccarelli et al. |
| 6,190,815 | B1 | 2/2001 | Ciccarelli et al. |
| 6,593,049 | B1 | 7/2003 | Veregin et al. |

(Continued)

OTHER PUBLICATIONS

Accuratus Cermaic Corporation, Silicon Carbide Material Properties.*

(Continued)

*Primary Examiner* — Justin Seo
*Assistant Examiner* — Roger W Pisha, II
(74) *Attorney, Agent, or Firm* — Pillsbury Winthrop Shaw Pittman LLP

(57) ABSTRACT

An intermediate transfer member containing a thermally conductive nanofiller dispersed in a polymer base, a method of forming the intermediate transfer member, and a method of printing an image to a substrate using the intermediate transfer member.

18 Claims, 3 Drawing Sheets

(56) References Cited

U.S. PATENT DOCUMENTS

| | | | |
|---|---|---|---|
| 6,756,176 B2 | 6/2004 | Stegamat et al. | |
| 6,830,860 B2 | 12/2004 | Sacripante et al. | |
| 7,329,476 B2 | 2/2008 | Sacripante et al. | |
| 7,494,757 B2 | 2/2009 | Sacripante et al. | |
| 7,695,884 B2 | 4/2010 | Vanbesien et al. | |
| 7,749,673 B2 | 7/2010 | Zhou et al. | |
| 7,968,266 B2 | 6/2011 | Field et al. | |
| 8,192,913 B2 | 6/2012 | Faucher et al. | |
| 2004/0109055 A1* | 6/2004 | Pan et al. | 347/103 |
| 2008/0152405 A1* | 6/2008 | Kuntz et al. | 399/335 |
| 2010/0286327 A1* | 11/2010 | Moorlag et al. | 524/496 |
| 2011/0097588 A1* | 4/2011 | Gervasi | B41J 2/0057 428/421 |
| 2011/0104499 A1* | 5/2011 | Wu et al. | 428/412 |
| 2012/0163888 A1* | 6/2012 | Zhang et al. | 399/333 |
| 2013/0065045 A1* | 3/2013 | Gervasi | G03G 15/2053 428/327 |

OTHER PUBLICATIONS

Karen Davis, Material Review: Alumina, 2010, School of Doctoral Studies (European Union) Journal, p. 2.*

* cited by examiner

THERMALLY CONDUCTIVE AQUEOUS TRANSFIX BLANKET

TECHNICAL FIELD

The present disclosure is generally related to indirect printing methods and, more specifically, to intermediate transfer members and printing processes involving intermediate transfer members.

BACKGROUND

Indirect printing methods generally include a two-step printing process including applying ink imagewise onto an intermediate transfer member, such as a drum or a belt, using an inkjet printhead, and then transferring a transient image to a substrate. After the ink is applied imagewise onto the intermediate transfer member, the ink wets or spreads on the intermediate transfer member to form a transient image. The transient image undergoes a change in properties, such as partial or complete drying, terminal or photo-curing or gelation, and is then transferred to the substrate.

Intermediate transfer members, also known as transfix belts or transfer blankets, for use in an indirect printing method are designed to satisfy a range of requirements, including wetting aqueous ink drops, heat absorption for water removal, and transfer of dried ink to the final substrate to give a clean plate.

Particularly, intermediate transfer members for use in indirect printing must meet specific sub-system requirements that are unique to the inkjet/transfix printing architecture. The intermediate transfer member desirably exhibits surface properties, such as energy, topology, and so forth, to enable wetting of the ink and subsequently, such as after the phase-change, to enable complete transfer of the transient image onto a substrate. Generally, intermediate transfer member materials that display good wettability do not sufficiently transfer the ink film onto a substrate or, conversely, do not sufficiently wet the ink but do transfer efficiently to the substrate.

SUMMARY

Provided is an intermediate transfer member comprising a composition comprising a thermally conductive nanofiller dispersed in a polymer base.

Also provided is a method comprising forming an intermediate transfer member by preparing a composition comprising a dispersion of a thermally conductive nanofiller in a polymer base.

Additionally provided is a method of printing an image to a substrate comprising applying an inkjet ink onto an intermediate transfer member using an inkjet printhead; spreading the ink onto the intermediate transfer member; inducing a property change of the ink; and transferring the ink to a substrate, wherein the intermediate transfer member comprises a thermally conductive nanofiller dispersed in a polymer base.

EMBODIMENTS

In this specification and the claims that follow, singular forms such as "a," "an," and "the" include plural foams unless the content clearly dictates otherwise. All ranges disclosed herein include, unless specifically indicated, all endpoints and intermediate values. In addition, reference may be made to a number of terms that shall be defined as follows:

"Optional" or "optionally" refer, for example, to instances in which subsequently described circumstances may or may not occur, and include instances in which the circumstance occurs and instances in which the circumstance does not occur.

The phrases "one or more" and "at least one" refer, for example, to instances in which one of the subsequently described circumstances occurs, and to instances in which more than one of the subsequently described circumstances occurs.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

"Room temperature" refers to a temperature of from about 20° C. to about 30° C., such as from about 20° C. to about 24° C., or from about 23° C. to about 27° C., or from about 26° C. to about 30° C.

"Thermally conductive" refers to the property of a nanofiller, or of a composite coating material, that has the inherent ability to conduct heat. Important characteristics of thermally conductive materials used herein include the absorption and transfer of heat at a coating surface.

An intermediate transfer member of this disclosure comprises a composition comprising a thermally conductive nanofiller dispersed in a polymer base. Including a thermally conductive nanofiller in the polymer base enables efficient heat transfer to ink drops on a surface of an intermediate transfer member, resulting in improved water removal and transfer. Thus, including such a composition in an intermediate transfer member results in an intermediate transfer member having both sufficient wetting and transfer properties.

Indirect Printing

Images may be applied to a substrate using a two-step printing process. An exemplary offset or indirect printing process is disclosed in U.S. Pat. No. 5,389,958, the entire disclosure of which is totally incorporated herein by reference.

Figure 1:
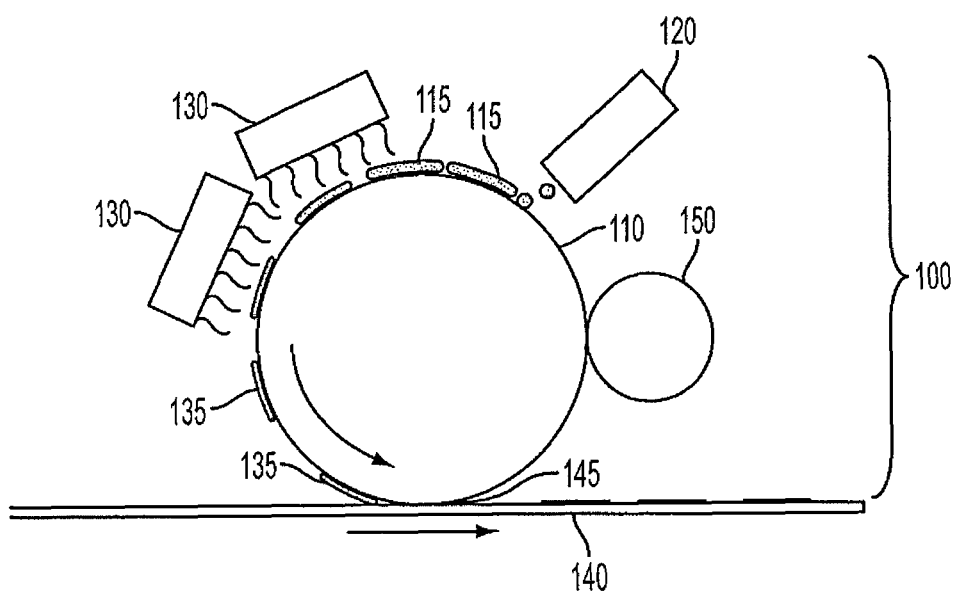
FIG. 1 is a schematic representation of a two-step printing process.

As shown in FIG. 1, a two-step printing process may include applying an ink imagewise onto an intermediate transfer member 110, such as a drum or a belt, using an inkjet printhead 120, wetting/spreading the ink on the intermediate transfer member 110 to form the transient image 115, inducing a property change in the transient image using a property-change device 130, and transferring the post-phase-change transient image 135 to the substrate 140. The substrate 140 may be fed to a nip region 145 in the direction of the arrow. A cleaning unit 150 may clean the intermediate transfer member 110 of any residual ink, dust, or other materials after transfer of the ink images has been completed.

Intermediate Transfer Member

An intermediate transfer member suitable for the above-two step printing process desirably has surface properties (such as energy, topology, and so forth) both to enable wetting of the ink and to enable complete transfer of the transient image (residual ink film along with pigment) onto a substrate. For the ink to wet well (i.e., spread) onto the intermediate transfer member, the surface free energy of the intermediate transfer member is desirably higher than the surface tension of the liquid ink. For the ink to subsequently be transferred from the intermediate transfer member to the substrate, the surface free energy of the intermediate transfer member is desirably lower than the surface free energy of the dry (resin) ink. Thus, the surface free energy of the intermediate transfer member desirable for wetting the ink may be different from the surface free energy desirable for transferring the ink image to the substrate.

As a general matter, the wettability or spread of a liquid on a surface is governed by the forces of interaction between the liquid, the surface, and the surrounding air, and in particular the surface free energy, as relating to the surface chemistry and surface topology. Surface tension is a parameter that can be described as the interaction between the forces of cohesion and the forces of adhesion, which determines whether or not wetting, or the spreading of liquid across a surface, occurs.

Young's Equation, which defines the balance of forces caused by a wet drop on a dry surface, stipulates that:

$$\gamma_{SL} + \gamma_{LV} \cos\theta = \gamma_{SV}$$

where $\gamma_{SL}$=forces of interaction between a solid and liquid; $\gamma_{LV}$=forces of interaction between a liquid and surrounding air; $\gamma_{SV}$=forces of interaction between a solid and surrounding air; and $\theta$=contact angle of the drop of liquid in relation to the surface. Young's Equation also shows that, if the surface tension of the liquid is lower than the surface energy, the contact angle is zero and the liquid wets the surface. The surface energy depends on several factors, such as the chemical composition and crystallographic structure of the solid, and in particular of its surface, the geometric characteristics of the surface and its roughness, and the presence of molecules physically adsorbed or chemically bonded to the solid surface.

A suitable intermediate transfer member comprises a composition comprising a thermally conductive nanofiller dispersed in a polymer base. The composition may further comprise an optional dispersant. The thermally conductive nanofiller may be present in the polymer base in an amount capable of enabling a thermal conductively of the composition to be from about 0.05 to about 0.5 $W \cdot m^{-1} \cdot K^{-1}$, such as from about 0.1 to about 0.3 $W \cdot m^{-1} \cdot K^{-1}$, or from about 0.12 to about 0.2 $W \cdot m^{-1} \cdot K^{-1}$. The thermally conductive nanofiller may be present in the polymer base in an amount of from about 0.5 to about 30 wt % based on a total weight of the composition, such as from about 1 to about 12 wt %, or from about 2 to about 5 wt %, or from about 8 to about 24 wt %.

Figure 2:
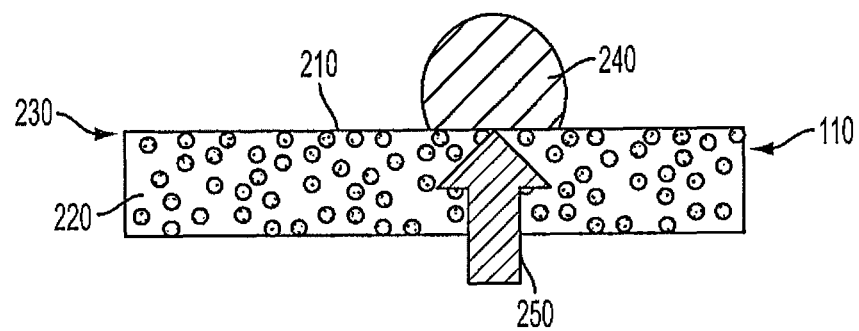
FIG. 2 is a cross section of an intermediate transfer member according to this disclosure.

As shown in FIG. 2, an intermediate transfer member 110 comprises a thermally conductive nanofiller 210 dispersed in a polymer matrix 220. The thermally conductive nanofiller 210 is present at or just beneath the coated surface 230 of the polymer matrix 220. The nanofiller is then continuously dispersed across the coated layer. The thermally conductive nanofiller 210 may be present at a depth of from about 0 to about 1 mm beneath the coated surface 230 of the polymer matrix 220, such as from about 0 to about 100 μm, or from about 0 to about 20 μm.

As a result of the nanofiller being dispersed beneath the coated surface 230 of the polymer matrix 220, heat transfer 250 to an ink drop 240 on the coated surface 230 of the polymer matrix 220 is enabled.

Polymer Base

Suitable polymer bases include low surface tension materials. For example, the polymer bases may have a surface tension of from about 18 to about 40 mN/n, such as from about 20 to about 35 mN/n, or from about 22 to about 30 mN/m.

Suitable polymer bases include silicones, such as polydimethylsilioxane, partially fluorinated fluorosilicones, and fully fluorinated fluorosilicones; fluoropolymers, such as FKM fluoropolymers, polytetrafluoroethylene (PTFE), and related partially and fully fluorinated polymeric fluorocarbons; and specialty fluorinated materials, such as fluorinated polyimide and networked siloxyfluorocarbons.

Suitable polymeric bases are thermally stable to a long cycle period to a temperature of preferably about 120° C., or about 80° C., or at minimum must be functional at a temperature of about 60° C., such as about 65° C. Elastomeric properties are preferred to enable ink transfer from the transfix blanket. Chemical resistance is required due to constant contact with liquid ink. Low surface tension is desired to enable efficient transfer of liquid ink and/or any other applied layers to the transfix blanket.

Nanofillers

Suitable nanofillers include those that are thermally conductive, such as inorganic/ceramic nanofillers, metal nanofillers, organic nanofillers, and mixtures thereof. Suitable nanofillers may have a thermal conductivity of greater than about 10 $W \cdot m^{-1} \cdot K^{-1}$, such as from about 10 to about 2300 $W \cdot m^{-1} \cdot K^{-1}$, or from about 100 to about 1800 $W \cdot m^{-1} \cdot K^{-1}$, or from about 300 to about 1000 $W \cdot m^{-1} \cdot K^{-1}$. Suitable inorganic/ceramic nanofillers may have a thermal conductivity of from about 10 to about 150 $W \cdot m^{-1} \cdot K^{-1}$, such as from about 10 to about 120 $W \cdot m^{-1} \cdot K^{-1}$, or from about 40 to about 100 $W \cdot m^{-1} \cdot K^{-1}$. Suitable metal nanofillers may have a thermally conductivity of from about 80 to about 400 $W \cdot m^{-1} \cdot K^{-1}$, such as from about 80 to about 350 $W \cdot m^{-1} \cdot K^{-1}$, or from about 150 to about 250 $W \cdot m^{-1} \cdot K^{-1}$. Suitable organic nanofillers may have a thermal conductivity of from about 100 to about 2300 $W \cdot m^{-1} \cdot K^{-1}$, or from about 100 to about 1800 $W \cdot m^{-1} \cdot K^{-1}$, or from about 300 to about 1000 $W \cdot m^{-1} \cdot K^{-1}$.

Suitable inorganic/ceramic nanofillers include titanium oxide, aluminum oxide, silicon, copper oxide, and zirconium oxide. Suitable metal nanofillers include Ni, Au, Ag, Pt, and Cu. Suitable organic nanofillers include carbon black, graphite, graphene, and diamond.

Suitable nanofillers have an average particle diameter of from about 50 nm to about 5 μm, such as from about 100 nm to about 1 μm, or from about 250 nm to about 750 nm.

Nanofillers may be present as spherical or non-spherical shapes. Non-spherical shapes include oblong, platelet, rod-shaped, cubic, rectangular, irregular, or otherwise shaped. Additionally, the nanofillers may be present as mixtures of nanofiller particles.

Dispersants

Dispersants may optionally be included in the composition in a concentration of, for example, from about 0 to about 15 wt %, or from about 0.5 to about 5 wt %, or from about 1 to about 3 wt %. Suitable dispersants include dispersant structures containing nanofiller affinic groups and polymer affinic groups. Nanofiller and polymer affinic groups are dependent on the types of nanofillers and polymer compositions of the layer coatings, as is known by those familiar in the art. Suitable examples include aminosiloxanes, aminohydrocarbons, aminofluorocarbons, acidic siloxanes, acidic hydrocarbons, acidic fluorocarbons, anionic and cationic siloxanes, siloxythiols, and siloxyalcohols.

Method of Making an Intermediate Transfer Member

A composition comprising thermally conductive nanofillers dispersed in a polymer base may be prepared according to any suitable method. Different processing methods may be used to finely disperse conductive nanofillers into the polymer base. For example, composites may be processed by hot melt extrusion, high shear homogenizer, sonication, milling, attrition, or other processes. The composition may undergo blanket coating to produce the intermediate transfer member. The intermediate transfer member may then be cast or surface coated onto a transfix member substrate.

Casting involves pouring the composition into a mold, and then curing. The composition may be cured over a time period of from about 0.5 to about 24 hours, such as from about 0.5 to about 12 hours, or from about 1 to about 4 hours. The composition may be cured at an appropriate temperature, such as from about 90° C. to about 200° C., or from about 90° C. to about 180° C., or from about 120° C. to about 140° C.

The composition may be deposited on a substrate. Any suitable substrate may be used, such as metals, rubbers, and fabrics. Suitable metals include steel, aluminum, nickel, and their alloys, and like metals and alloys of like metals. Suitable rubbers include ethylene propylene dienes, fluoroelastomers, n-butyl rubbers, silicone rubbers, other elastomers, and the like. A suitable fabric material refers to a textile structure comprised of mechanically interlocked fibers or filaments, which may be woven or nonwoven. Fabrics are materials made from fibers or threads and woven, knitted, or pressed into a cloth or felt type structures. Woven refers to closely oriented by warp and filler strands at right angles to each other. Nonwoven refers to randomly integrated fibers or filaments. Suitable fabrics include woven or nonwoven cotton fabric, graphite fabric, fiberglass, woven or nonwoven polyimide (for example, KEVLAR™, available from DuPont), woven or nonwoven polyamide, such as nylon or polyphenylene isophthalamide (for example, NOMEX™, of E. I. DuPont of Wilmington, Del.), polyester, aramids, polycarbonate, polyacryl, polystyrene, polyethylene, polypropylene, cellulose, polysufone, polyxylene, polyacetal, and the like, and mixtures thereof. The substrate may have a thickness of from about 1 to about 70 mm, such as from about 1 to about 30 mm, or from about 3 to about 10 mm The composition may be deposited on the substrate by any suitable process, such as draw-down coating, spray coating, spin coating, flow coating, dipping, spraying such as by multiple spray applications of very fine thin films, casting, web-coating, roll-coating, extrusion molding, laminating, or the like. The thickness of the surface coating may be from about 5 to about 1000 microns thick, such as from about 5 to about 100 microns, or from about 5 to about 20 microns. The surface coating may be cured for a time period of from about 0.5 to about 6 hours, such as from about 0.5 to about 3 hours, or from about 1 to about 4 hours, or from about 3.5 to about 6 hours, at an appropriate temperature, such as from about 90° C. to about 200° C., or from about 90° C. to about 180° C., or from about 120° C. to about 140° C.

Ink Materials

Any ink suitable for use in an indirect printing method may be used. Suitable ink compositions include phase change inks, gel based inks, curable inks, aqueous inks, and solvent inks. The ink composition may include a resin, colorants, waxes, and other additives. The term "ink composition" refers, for example, to all colors of a particular ink composition including, for example, usable color sets of an ink composition. For example, an ink composition may refer to a usable color set of phase change ink that includes cyan, magenta, yellow, and black inks. Therefore, as defined herein, cyan phase change ink and magenta phase change ink are different ink colors of the same ink composition.

The term "phase change ink," also referred to as "solid ink," refers to inks that remain in a solid phase at ambient temperature and that melt to a liquid phase when heated above a threshold temperature, referred to in some instances as a melt temperature. The ambient temperature is the temperature of the air surrounding the imaging device; however, the ambient temperature may be at room temperature (about 20° C. to about 25° C.) when the imaging device is positioned in an enclosed or otherwise defined space. Melt temperatures for phase change ink may be, for example, from about 70° C. to about 140° C., such as from about 70° C. to about 95° C., or from about 80° C. to about 120° C., or from about 110° C. to about 140° C. When phase change ink cools below the melt temperature, the ink returns to the solid phase.

As used herein, the terms "gel ink" and "gel based ink" refer to inks that remain in a gelatinous state at the ambient temperature and that may be heated or otherwise altered to have a different viscosity suitable for ejection by a printhead. Gel ink in the gelatinous state may have a viscosity, for example, between from about $10^5$ and $10^7$ centipoise (cP); however, the viscosity of gel ink may be reduced to a liquid-like viscosity by heating the ink above a threshold temperature, referred to as a gelation temperature. The gelation temperature may be, for example, from about 30° C. to about 50° C., such as from about 30° C. to about 38° C., or from about 36° C. to about 44° C., or from about 42° C. to about 50° C. The viscosity of the gel ink increases when the ink cools below the gelation temperature.

Some ink compositions, referred to herein as curable inks, may be cured by the imaging device. As used herein, the process of "curing" ink refers to curable compounds in an ink undergoing an increase in molecular weight in response to being exposed to radiation. Exemplary processes for increasing the molecular weight of a curable compound include, for example, crosslinking and chain lengthening. Cured ink is suitable for document distribution, is resistant to smudging, and may be handled by a user. Radiation suitable to cure ink may encompass the full frequency (or wavelength) spectrum including, for example, microwaves, infrared, visible, ultraviolet, and x-rays. For instance, ultraviolet-curable gel ink, referred to herein as UV gel ink, becomes cured after being exposed to ultraviolet radiation. As used herein, the term "ultraviolet" radiation encompasses radiation having a wavelength of from about 50 nm to about 500 nm.

Any suitable resin may be used to from the ink composition. Suitable resins include polyester resins, including the resins described in U.S. Pat. Nos. 6,593,049 and 6,756,176, the entire disclosures of which are totally incorporated herein by reference. Suitable crystalline polyester resins include those known in the art, such as those disclosed in U.S. Pat. No. 8,192,913, the entire disclosure of which is totally incorporated herein by reference. Suitable crystalline polyester resins also include those disclosed in U.S. Pat.

Nos. 7,329,476; 7,494,757; 7,968,266; 7,749,673; and 7,695,884, the entire disclosures of which are totally incorporated herein by reference. Suitable resins may also include a mixture of at least one amorphous polyester resin and a crystalline polyester resin, as described in U.S. Pat. No. 6,830,860, the entire disclosure of which is totally incorporated herein by reference Suitable colorants or pigments include pigment, dye, mixtures of pigment and dye, mixtures of pigments, mixtures of dyes, and the like. For simplicity, the wan "colorant" refers to colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, and mixtures thereof, in an amount of about 0.1 to about 35 wt % based upon the total weight of the composition, such as from about 1 to about 25 wt %.

Suitable colorants include those known in the art, such as those disclosed in, for example, U.S. Pat. No. 8,192,913, the entire disclosure of which is totally incorporated herein by reference. The colorant may be present in the ink in an amount ranging from about 1 to about 35 wt % of the ink particles on a solids basis, such as from about 5 to about 25 wt %, or from about 5 to about 15 wt %.

Suitable waxes include either a single type of wax or a mixture of two or more different waxes. A single wax can be added to ink compositions, for example, to improve particular ink properties, such as particle shape, presence and amount of wax on the ink particle surface, charging and/or fusing characteristics, gloss, stripping, offset properties, and the like. Alternatively, a combination of waxes may be added to provide multiple properties to the ink composition.

Suitable waxes include those known in the art, such as, for example, those disclosed in U.S. Pat. No. 8,192,913, the entire disclosure of which is totally incorporated herein by reference. The ink particles may contain the wax in an amount of, for example, from about 1 to about 25 wt % of the ink particles, such as from about 3 to about 15 wt %, or from about 5 to about 20 wt %, or from about 5 to about 12 wt %.

Suitable additives include any additive that enhances the properties of the ink composition. For example, the ink composition may include positive or negative charge control agents. Other additives include organic spacers, color enhancers, and other known toner additives. Surface additives that can be added to the ink compositions after washing or drying include, for example, metal salts, metal salts of fatty acids, colloidal silicas, metal oxides, strontium titanates, combinations thereof, and the like, which additives may each be present in an amount of from about 0.1 to about 10 wt % of the ink particles, such as from about 0.5 to about 7 wt %. Examples of such additives include, for example, those disclosed in U.S. Pat. Nos. 3,590,000; 3,720,617; 3,655,374; and 3,983,045, the entire disclosures of which are totally incorporated herein by reference. Other additives include zinc stearate and AEROSIL R972® available from Degussa. The coated silicas of U.S. Pat. Nos. 6,190,815 and 6,004,714, the entire disclosures of which are totally incorporated herein by reference, may also be selected in amounts, for example, of from about 0.05 to about 5 wt % of the toner particles, such as from about 0.1 to about 2 wt %.

An ink suitable for use in the above-described two-step printing process may have surface tension, viscosity, and particle size suitable for use in a piezoelectric inkjet printhead. For example, the surface tension of the jettable ink may be from about 15 to about 50 dynes/cm, such as from about 15 to about 30 dynes/cm, or from about 25 to about 40 dynes/cm, or from about 35 to about 50 dynes/cm. The viscosity of the jettable inks may be, for example, from about 1 to about 30 centipoise (cps) at 30° C., such as from about 1 to about 14 cps, or from about 8 to about 20 cps, or from about 16 to about 30 cps. The particle size of the jettable inks may be less than about 1 µm, such as less than about 600 nm, or less than about 300 nm, or less than about 150 nm.

EXAMPLES

The following Examples are intended to be illustrative only and are not intended to limit the scope of the present disclosure. Also, parts and percentages are by weight unless otherwise indicated.

Example 1

Preparation of Poly(pentafluorostyrene)-P(PFS)

To a 3-necked round bottomed flask equipped with a reflux condenser, overhead stirrer and nitrogen inlet was added pentafluorostyrene (99.6 g), TEMPO (0.468 g) and Vazo 67 (0.384 g). This was stirred at room temperature with N2 bubbling for 10 minutes and then heated to an oil bath temperature of 135° C. The temperature was maintained for 7.5 hours after which THE (70 mlL) was added at ~65° C. and then this was precipitated from Methanol (~400 mL). The solid was isolated and dried to give 51.5 g of P(PFS).

Example 2

Preparation of Carbon Black Dispersion

To a 1S Union Process attritor was charged 1800 g of stainless steel shot (3 mm) and Trifluorotoluene (TFT, 175 mL). To this was added P(PFS) (16.5 g) and stirred at 200 rpm until the polymer is dissolved. To this was added carbon black (Cabot Black Pearls, 41 g) over a 5 minute period and then the attritor temperature was raised to 105° C. and maintained for 7 hr. Occasionally additional TFT was added to maintain the liquid level. To the attritor was added more TFT (50 mL) to reduce the viscosity and then sieved to remove the stainless steel shot to give 240 g of carbon black dispersion at 10% carbon black solids loading.

Example 3

Preparation of Plate Material

To a 50 mL bottle was added a Gelest 2 part silicone cure system (Gel 9667-40-part A, 11.25 g). To this was added TFT (5.6 g) while stirring with an overhead stirrer at ~1000 rpm. To this was further added the Carbon black dispersion (14.19 g) and Platinum catalyst (Gelest SIP 68132, 3 umL). This was stirred for 1.5 hr and then Part B (Gel 9667-40, 2.25 g) was added. This was stirred for 15 minutes followed by deaeration (15 minutes, by applying a vacuum). This was then coated onto mylar using a 40 MIL gap slot coater. The coating was air dried for 2 hours and then cured at 155° C. for 18 hours to give the plate material coating containing an 8% carbon black loading.

RESULTS

Figure 3:
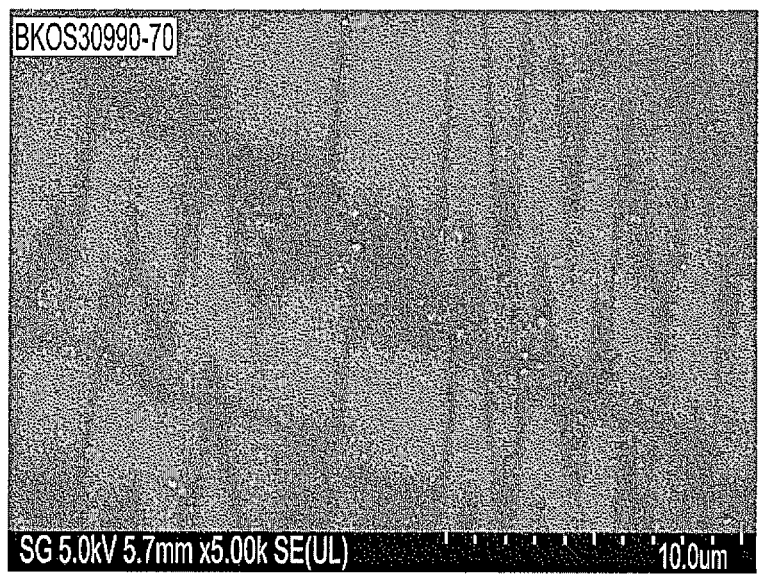
FIG. 3 is an SEM image of a cured carbon black/fluorosilicon composition of Example 3.

Nano-sized (average particle size of 400-600 nm) functionalized carbon black particles were incorporated into fluorosilicone in an amount of about 8 wt %. The particles displayed homogeneous sub-micron dispersion within the fluorosilicone matrix, as is displayed in FIG. 3, which is an SEM image of the cured composition of Example 3. The thermal conductivity of the mixture was from about 0.13 to about 0.16 W·m$^{-1}$·K$^{-1}$. Thus, an efficient dispersion of nanoparticles was obtained, and the desired thermal conductivity of the resulting layer was obtained.

The results of repeat conductivity measurements of coating Example 3 are shown in the following Table 1.

TABLE 1

| Example | Mixture | Conductivity (W · m$^{-1}$ · K$^{-1}$) |
|---|---|---|
| Example 3 | Fluorosilicone/8% CB | 0.1603 |
| Example 3 | Fluorosilicone/8% CB | 0.1365 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An intermediate transfer member comprising a composition comprising a thermally conductive nanofiller dispersed in a polymer base, wherein the polymer base has a surface tension of from 18 to 40 mN/m, wherein the nanofiller is present in the polymer base in an amount of from 0.5 to 30 wt % based on a total weight of the composition, wherein the nanofiller is selected from the group consisting of Ni, Au, Ag, Pt, Cu, titanium oxide, aluminum oxide, silicon, copper oxide, zirconium oxide, carbon black, graphite, graphene, diamond and mixtures thereof, further wherein the intermediate transfer member has a thermal conductivity of from 0.05 to 0.5 W·m$^{-1}$·K$^{-1}$.

2. The intermediate transfer member of claim 1, wherein the nanofiller has an average particle diameter of from 50 nm to 5 μm.

3. The intermediate transfer member of claim 1, wherein the nanofiller is a metal selected from the group consisting of Ni, Au, Ag, Pt, and Cu.

4. The intermediate transfer member of claim 1, wherein the nanofiller is an inorganic/ceramic nanofiller selected from the group consisting of titanium oxide, aluminum oxide, silicon, copper oxide, and zirconium oxide.

5. The intermediate transfer member of claim 1, wherein the nanofiller is an organic conductive nanofiller selected from the group consisting of carbon black, graphite, graphene, and diamond.

6. The intermediate transfer member of claim 1, wherein the nanofiller has a thermal conductivity of from 10 to 2300 W·m$^{-1}$·K$^{-1}$.

7. The intermediate transfer member of claim 1, wherein the polymer base is selected from the group consisting of silicones, fluoropolymers, and specialty fluorinated materials.

8. The intermediate transfer member of claim 1, wherein the polymer base has a surface tension of from 18 to 40 mN/m.

9. A printing apparatus comprising the intermediate transfer member of claim 1.

10. The intermediate transfer member of claim 7, wherein the polymer base comprises silicones.

11. The intermediate transfer member of claim 10, wherein the silicones is selected from the group consisting of polydimethylsilioxane, fluorosilicones, and mixtures thereof.

12. The intermediate transfer member of claim 1, wherein the nanofiller comprises carbon black.

13. The intermediate transfer member of claim 12, wherein the carbon black has an average particle size of 400 to 600 nm.

14. The intermediate transfer member of claim 3, wherein the nanofiller comprises a metal nanofiller selected from the group consisting of Ni, Au, Ag and Pt.

15. A method of making an intermediate transfer member, the method comprising:
    providing a composition comprising a dispersion of a thermally conductive nanofiller in a polymer base, wherein the polymer base has a surface tension of from 18 to 40 mN/m, wherein the nanofiller is present in the polymer base in an amount of from 0.5 to 30 wt % based on a total weight of the composition, wherein the nanofiller is selected from the group consisting of Ni, Au, Ag, Pt, Cu, titanium oxide, aluminum oxide, silicon, copper oxide, zirconium oxide, carbon black, graphite, graphene, diamond and mixtures thereof, further wherein the intermediate transfer member has a thermal conductivity of from 0.05 to 0.5 W·m$^{-1}$·K$^{-1}$;
    coating a support with the composition; and
    curing the coating to form the intermediate transfer member.

16. The method of claim 15, wherein the nanofiller is selected from the group consisting of metals, metal oxides, organic conductive nanofillers, and mixtures thereof.

17. The method of claim 15, wherein the polymer matrix comprises a silicon, a fluoropolymer, a specialty fluorinated material, or a mixture thereof.

18. A method of printing an image to a substrate comprising:
    applying an inkjet ink onto an intermediate transfer member using an inkjet printhead;
    spreading the ink onto the intermediate transfer member;
    inducing a property change of the ink; and
    transferring the ink to the substrate,
    wherein the intermediate transfer member comprises a thermally conductive nanofiller dispersed in a polymer base, wherein the polymer base has a surface tension of from 18 to 40 mN/m, wherein the nanofiller is present in the polymer base in an amount of from 0.5 to 30 wt % based on a total weight of the composition, further wherein the intermediate transfer member has a thermal conductivity of from 0.05 to 0.5 W·m$^{-1}$·K$^{-1}$.

* * * * *